US010360837B2

(12) United States Patent
Li et al.

(10) Patent No.: US 10,360,837 B2

(45) Date of Patent: Jul. 23, 2019

(54) BILATERAL DRIVING DEVICE AND TABLET DISPLAY

(71) Applicant: Wuhan China Star Optoelectronics Technology Co., Ltd., Wuhan, Hubei (CN)

(72) Inventors: Man Li, Guangdong (CN); Xiaoping Tan, Guangdong (CN); Jiehui Qin, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 213 days.

(21) Appl. No.: 15/112,403

(22) PCT Filed: Jun. 29, 2016

(86) PCT No.: PCT/CN2016/087663

§ 371 (c)(1),
(2) Date: Jul. 18, 2016

(87) PCT Pub. No.: WO2017/215033

PCT Pub. Date: Dec. 21, 2017

(65) Prior Publication Data

US 2018/0166004 A1 Jun. 14, 2018

(30) Foreign Application Priority Data

Jun. 16, 2016 (CN) .......................... 2016 1 0435064

(51) Int. Cl.
*G09G 3/30* (2006.01)
*G09G 3/36* (2006.01)
(Continued)

(52) U.S. Cl.
CPC ............ *G09G 3/2092* (2013.01); *G09G 3/20* (2013.01); *G09G 3/3208* (2013.01);
(Continued)

(58) Field of Classification Search
CPC ......... G09G 2300/0426; G09G 3/3648; G09G 3/3233; G06F 3/0412; G06F 3/044
See application file for complete search history.

(56) References Cited

U.S. PATENT DOCUMENTS

2007/0019143 A1* 1/2007 Chen ................ G02F 1/136286 349/139
2007/0195014 A1* 8/2007 Ryu ...................... G09G 3/293 345/67
(Continued)

*Primary Examiner* — Nan-Ying Yang
(74) *Attorney, Agent, or Firm* — Andrew C. Cheng

(57) ABSTRACT

The present application discloses a bilateral driving device and a tablet display. The bilateral driving device includes a first source driver, a second source driver and at least two driving signal lines connected to the first source driver, a second source driver, wherein the connection of the middle site of the at least two driving signal lines is not parallel to the specific edge of the display panel. By adapting the embodiment of the present application can utilize the visual characteristics of the human eye, the connection of the middle site of the at least two driving signal lines is not parallel to the edge of the display panel to confuse the dark spots and bright spots, to enhance brightness uniformity of the display panel, and improve the display quality.

11 Claims, 5 Drawing Sheets

(51) Int. Cl.
*G06F 3/038* (2013.01)
*G09G 5/00* (2006.01)
*G09G 3/20* (2006.01)
*G09G 3/3208* (2016.01)

(52) U.S. Cl.
CPC ......... *G09G 3/3611* (2013.01); *G09G 3/3685* (2013.01); *G09G 2310/0281* (2013.01); *G09G 2320/0223* (2013.01); *G09G 2320/0233* (2013.01)

(56) References Cited

U.S. PATENT DOCUMENTS

2008/0024710 A1* 1/2008 Moon ............... G02F 1/133707 349/141
2011/0075089 A1* 3/2011 Jheng .................... G02F 1/1345 349/152
2015/0287741 A1* 10/2015 Wang .................. H01L 23/5226 257/71
2015/0348455 A1* 12/2015 Jeon ......................... G09G 3/20 345/55

* cited by examiner

BILATERAL DRIVING DEVICE AND TABLET DISPLAY

CROSS REFERENCE

This application claims the priority of Chinese Patent Application No. 201610435064.3, entitled "BILATERAL DRIVING DEVICE AND TABLET DISPLAY", filed on Jun. 16, 2016, the disclosure of which is incorporated herein by reference in its entirety.

FIELD OF THE INVENTION

The present application relates to a display technology field, and more particularly to a bilateral driving device and tablet display apparatus.

BACKGROUND OF THE INVENTION

With the development of display technology and terminal technology, tablet displays are widely used in people's daily life. Tablet display is formed by a display panel and a driving means, the drive means is connected to the display panel, the pixel of the display panel can be driven to display. Generally, the driving means includes a driver and a driving signal line, the driving signal generated from the driver is transmitted by the driving signal line to the pixel of the display panel. Since the signal transmission in the presence of the driving signal line has a RC delay, the driving signal receiving time of the pixel far from the driver is longer.

In order to avoid long delays, for the display panel the larger area, the bilateral driving means is adapted in the conventional technology, i.e. the driving means are disposed on opposite sides of the display panel, the drive signal produced by each driving means are transmission in half of the distance, thereby reducing delay. However, for the pixel in the middle of the driving signal lines, the distance to both of the driving means are farthest, with a maximum RC delay. When other pixels are already turn on, the pixel located in the middle is not fully turn on due to the insufficient charging, resulting in a "dark zone" appears in the display panel.

SUMMARY OF THE INVENTION

A bilateral driving device and a tablet display is provided in the embodiment of the present application to enhance brightness uniformity of the display panel, and improve the display quality.

In an aspect, a bilateral driving device is provided in the embodiment of the present application to apply in the display panel, wherein the bilateral driving device includes a first source driver, a second source driver and at least two driving signal lines connected to the first source driver, a second source driver, wherein the connection of the middle site of the at least two driving signal lines is not parallel to the specific edge of the display panel.

As a possible embodiment, with respect to the specific edge, the connection of the middle site of the at least two driving signal lines can be in a triangular wave arrangement.

As a possible embodiment, along the specific direction of the edge, the distance from the middle site of the at least two driving signal lines to the specific edge is increasing or decreasing alternately within a predetermined distance range, and makes the middle site of the at least two driving signal lines can be in a triangular wave arrangement.

As a possible embodiment, wherein along the specific direction of the edge, the distance from the middle site of the at least two driving signal lines to the specific edge can be a first distance and a second distance alternately, and makes the distance from the middle site of the at least two driving signal lines to the specific edge is increasing or decreasing alternately within a predetermined distance range.

As a possible embodiment, with respect to the specific edge, the connection of the middle site of the at least two driving signal lines can be in a trapezoidal wave arrangement.

As a possible embodiment, the first source driver and the second source driver are distributed and arranged along two opposite edges of the display panel separately, and wherein the specific edge is the edge of the first source driver distributed along or the edge of the second source driver distributed along.

The second aspect, a tablet display is provided in the embodiment of the present application, wherein the tablet display including a display panel and a bilateral driving device provided in the first aspect or any possible embodiment mentioned in the first aspect, wherein the bilateral driving device is used to provide a source driving signal to the display panel.

As a possible embodiment, the display panel is a liquid crystal panel.

As a possible embodiment, the display panel is an organic light-emitting diode, OLED display.

In the embodiment of the present application, the bilateral driving device includes a first source driver, a second source driver and at least two driving signal lines connected to the first source driver, a second source driver. By utilizing the visual characteristics of the human eye, the connection of the middle site of the at least two driving signal lines is not parallel to the edge of the display panel to confuse the dark spots and bright spots, to enhance brightness uniformity of the display panel, and improve the display quality.

BRIEF DESCRIPTION OF THE DRAWINGS

In order to more clearly illustrate the embodiments of the present application or prior art, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts obtained should be considered within the scope of protection of the present application.

Specifically, the terminologies in the embodiments of the present application are merely for describing the purpose of the certain embodiment, but not to limit the invention. Examples and the claims be implemented in the present application requires the use of the singular form of the book "an", "the" and "the" are intend to include most forms unless the context clearly dictates otherwise. It should also be understood that the terminology used herein that "and/or" means and includes any or all possible combinations of one or more of the associated listed items.

A bilateral driving device and a tablet display are provided in the embodiment of the present application to enhance brightness uniformity of the display panel, improve the display quality. Below with reference to embodiments of the present invention will be described in detail.

Figure 1:
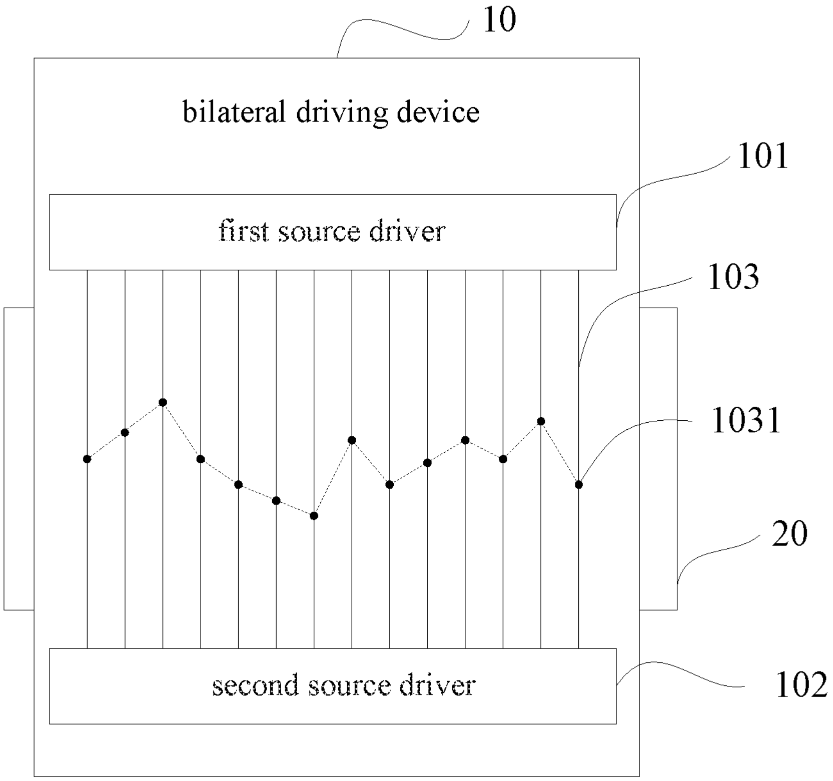
FIG. 1 illustrates a schematic structure of a bilateral driving device of the embodiment of the present application.

Referring to FIG. 1, FIG. 1 illustrates a schematic structure of a bilateral driving device of the embodiment of the present application. As illustrated in FIG. 1, the bilateral driving device 10 is applied in the display panel 20, wherein the bilateral driving device 10 includes a first source driver 101, a second source driver 102, and at least two driving signal lines 103, wherein each of the driving signal lines 103 are connected to the first source driver 101 and the second source driver 102.

In the present embodiment, each black dot is the middle site 1031 of the driving signal line 103, the dotted line shows the connecting line of the middle site 1031 of the at least driving signal lines 103 described above. As illustrated in FIG. 1, the connecting line of the middle site 1031 of the at least driving signal lines 103 described above is not parallel to the middle site 1031 of the specific edge of the display panel. Preferably, the connecting line of the middle site 1031 of the at least driving signal lines 103 can be a wiring line.

Specifically, the first source driver 101 and the second source driver 102 are distributed and arranged along two opposite edges of the display panel 20 separately. Wherein the specific edge can be the edge arranged with the first source driver 101 or the edge arranged with the second source driver 102. Alternatively, the bilateral driving device 10 can includes one or more pairs of the first source driver 101 and the second source driver 102.

In the embodiments, each pair of the first source driver 101 and the second source driver 102 is connected by the driving signal lines 103, the driving signal lines 103 can be located below the display panel, each of the driving signal lines 103 is connected to the pixel of one row or one columns of the display panel. The middle site 1031 on the driving signal lines 103 is the site has the farthest distance from the driving signal lines 103 to the first source driver 101 and the second source driver 102. The pixel connected to the middle site 1031 of the driving signal lines 103 is the pixel having the worst RC delay in the entire row or entire column. When these pixels having the worst RC delay are in linear distribution, a dark band will be formed in the LCD panel. When these pixel having the worst RC delay is not in linear distribution, due to the visual characteristics of the human eye, the dark spots and the bright spot are confused, so that the dark spots become non-obvious, and can avoid forming the dark bands.

As a possible embodiment, the length of the driving signal line can be adjusted, so that the lengths of the different driving signal lines are inconsistent, so that the connection of the middle site of the driving signal lines is not parallel to the specific edge of the panel display.

Alternatively, the connection of the middle site of the at least two driving signal lines 103 is not parallel to the specific edge of the panel display 20. The connection of the middle site of the at least two driving signal lines 103 can be random distribution within a predetermined distance in the vicinity of the reference line, wherein the reference line can be the central axis parallel to the specific edge of the panel display 20. Or, it can be a regular distribution by a preset law of the middle site of the at least two driving signal lines 103.

Figure 2:
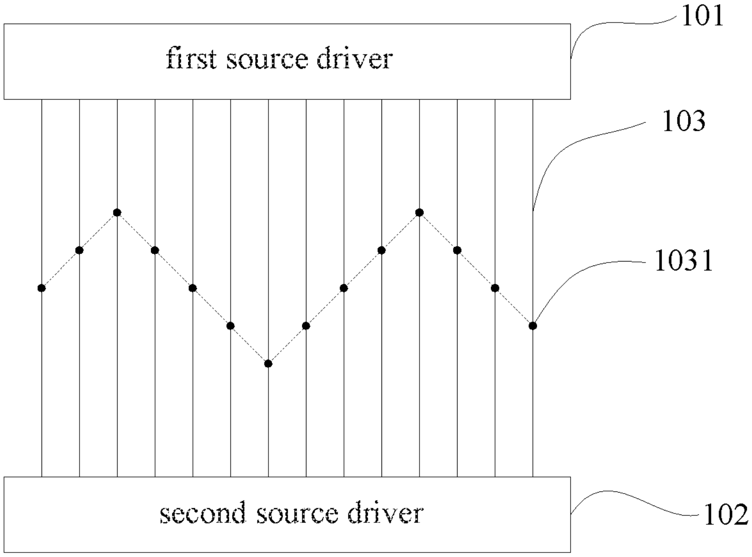
FIG. 2 illustrates a schematic structure of the arrangement middle site of at least two driving signal lines of the bilateral driving device of the embodiment of the present application.

In some possible embodiments, with respect to the specific edge, the connection of the middle site of the at least two driving signal lines can be in a triangular wave arrangement In a specific embodiments, as illustrated in FIG. 2, along the specific direction of the edge, the distance from the middle site 1031 of the at least two driving signal lines 103 to the specific edge is increasing or decreasing alternately within a predetermined distance range, so that the middle site of the at least two driving signal lines can be in a triangular wave arrangement.

Figure 3:
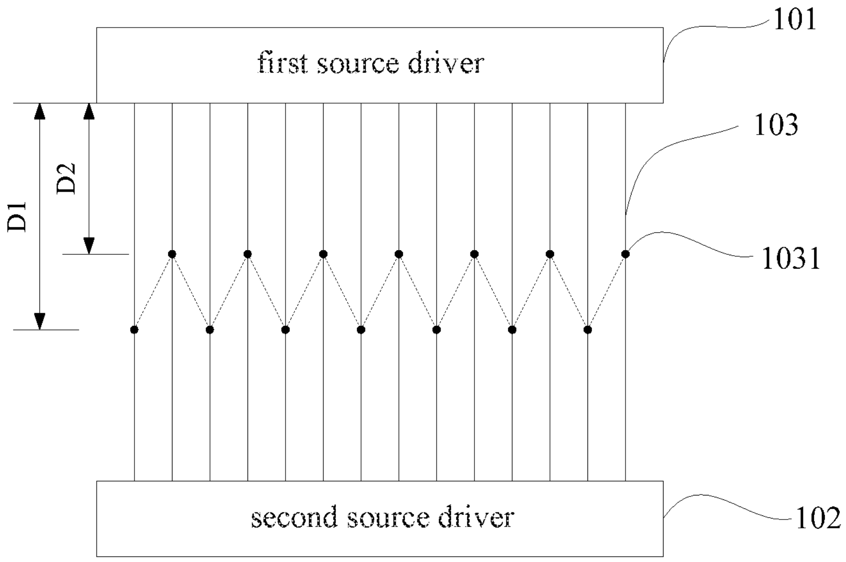
FIG. 3 illustrates a schematic structure of the arrangement middle site of at least two driving signal lines of the bilateral driving device of another embodiment of the present application.

As a possible embodiment, as illustrated in FIG. 3, along the specific direction of the edge, the distance from the middle site 1031 of the at least two driving signal lines 103 to the specific edge can be a first distance D1 and a second distance D2 alternately, so that the distance from the middle site of the at least two driving signal lines to the specific edge is increasing or decreasing alternately within a predetermined distance range.

Wherein, the edge of the first source driver 101 distributed along in the display panel 20 is used as the specific edge as an example to describe. It should be understood that, in real practice, the specific edge can be the edge of the second source driver 102 distributed along in the display panel 20. In a specific embodiment, the aforementioned predetermined distance range can be set according to the length of the vertical edge, for example, it can be set as ½, ⅓, ¼ of the length of the vertical edge and so on. Wherein the vertical edge is the edge perpendicular to the specific edge.

Figure 4:
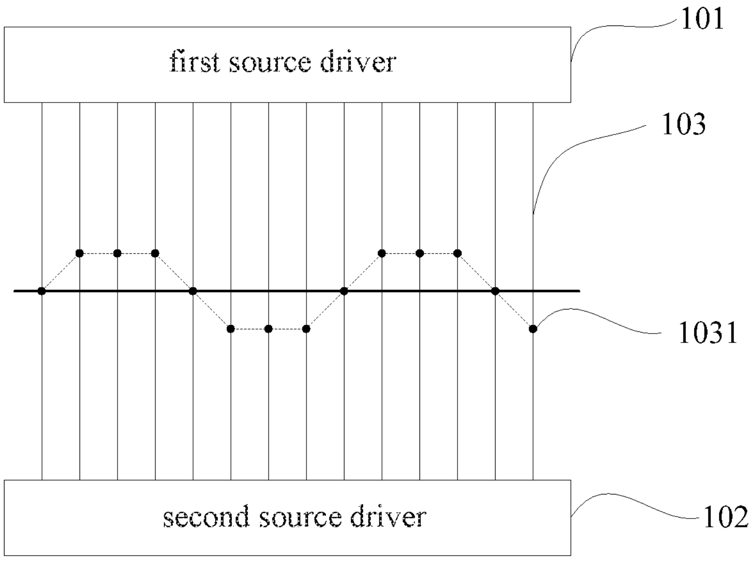
FIG. 4 illustrates a schematic structure of the arrangement middle site of at least two driving signal lines of the bilateral driving device of another embodiment of the present application.

In some possible embodiments, as illustrated in FIG. 4, with respect to the specific edge, the connection of the middle site of the at least two driving signal lines 103 can be in a trapezoidal wave arrangement. In particular, along the specific direction of the edge, for example, from left to right or from right to left, the distance from the middle site 1031 of the at least two driving signal lines 103 to the specific edge can be set by following rule as "incremented, unchanged, decreased, unchanged, and then incremented", so that the connection of the middle site 1031 of the at least two driving signal lines 103 and the reference line can form a plurality of the trapezoidal wherein the trapezoidal are in contacted with each other and in an alternately direction. Wherein the reference line can be the central axis parallel to the specific edge of the panel display 20. The distance of the middle site 1031 of the at least two driving signal lines 103 to the reference line can be set according to the length of the vertical edge, for example, the farthest distance is not more than ¼ of the length of the vertical edge.

Figure 5:
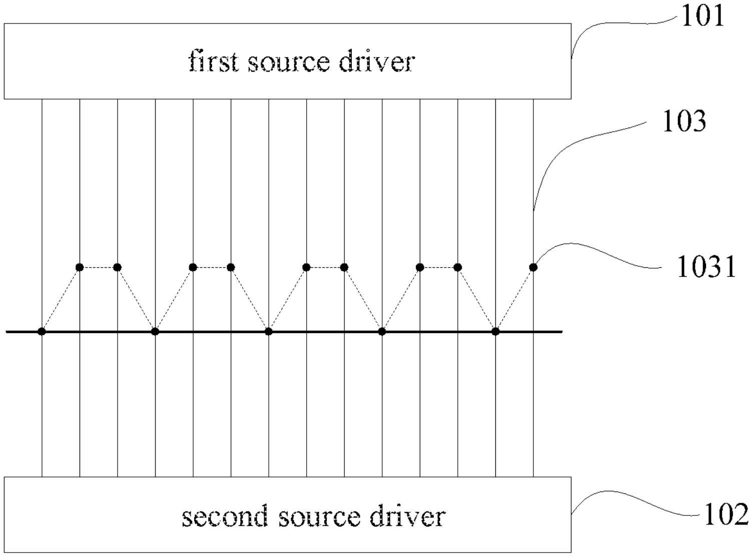
FIG. 5 illustrates a schematic structure of the arrangement middle site of at least two driving signal lines of the bilateral driving device of another embodiment of the present application.

As a possible embodiment, along the specific direction of the edge, for example, from left to right or from right to left, the distance from the middle site 1031 of the at least two driving signal lines 103 to the specific edge can be set by following rule as "incremented, unchanged, decreased, and then incremented", meanwhile, as illustrated in FIG. 5, the connection of the middle site 1031 of the at least two driving signal lines 103 and the reference line can form a plurality of the trapezoidal wherein the trapezoidal are in the same direction and in contacted with each other. Wherein the reference line can be parallel to the specific edge and is located closed to the central axis. Alternatively, the reference line can be located below or above the central axis of the display panel 20.

Figure 6:
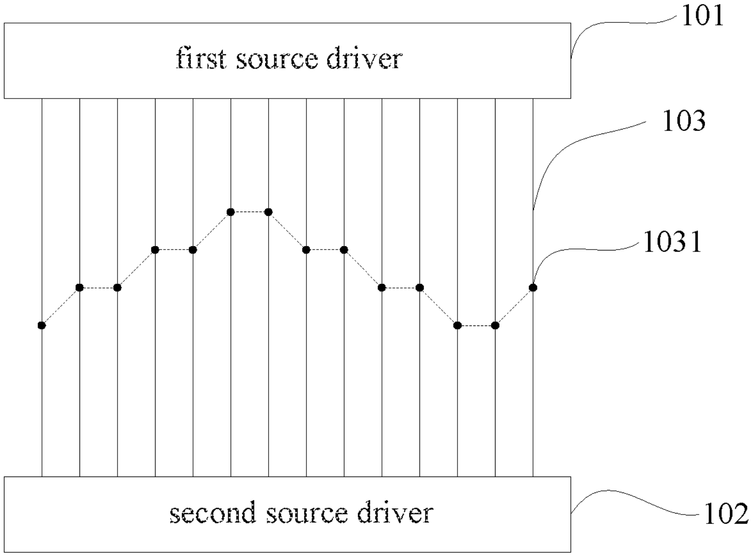
FIG. 6 illustrates a schematic structure of the arrangement middle site of at least two driving signal lines of the bilateral driving device of another embodiment of the present application.

In some possible embodiments, as illustrated in FIG. 6, with respect to the specific edge, the connection of the middle site of the at least two driving signal lines 103 can be in stepped increasing arrangement or in stepped descending arrangement alternately. I.e., along the specific direction of the edge, for example, from left to right or from right to left, the distance from the middle site 1031 of the at least two driving signal lines 103 to the specific edge can be repeated in accordance with "incremented, unchanged" in several times, and then repeated in accordance with "decreased, unchanged" in the several cycles.

Figure 7:
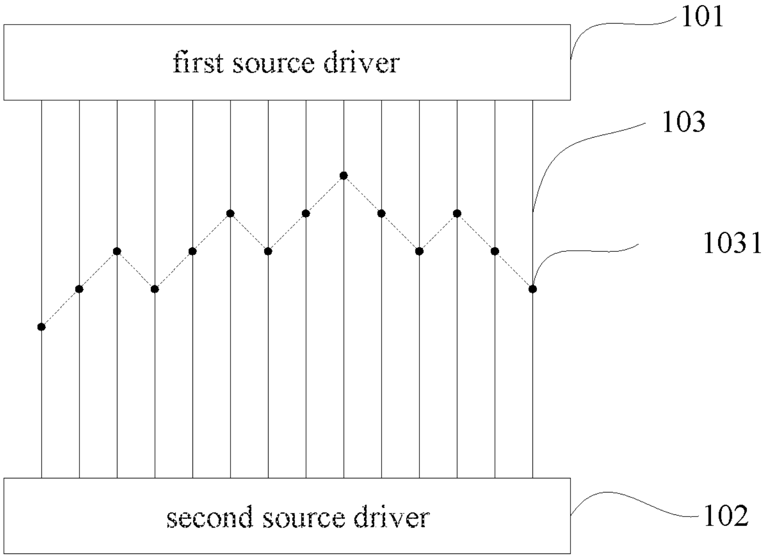
FIG. 7 illustrates a schematic structure of the arrangement middle site of at least two driving signal lines of the bilateral driving device of another embodiment of the present application.

In some possible embodiments, as illustrated in FIG. 7, with respect to the specific edge, the connection of the middle site of the at least two driving signal lines 103 can be serrated increasing or decreasing in alternatively.

Figure 8:
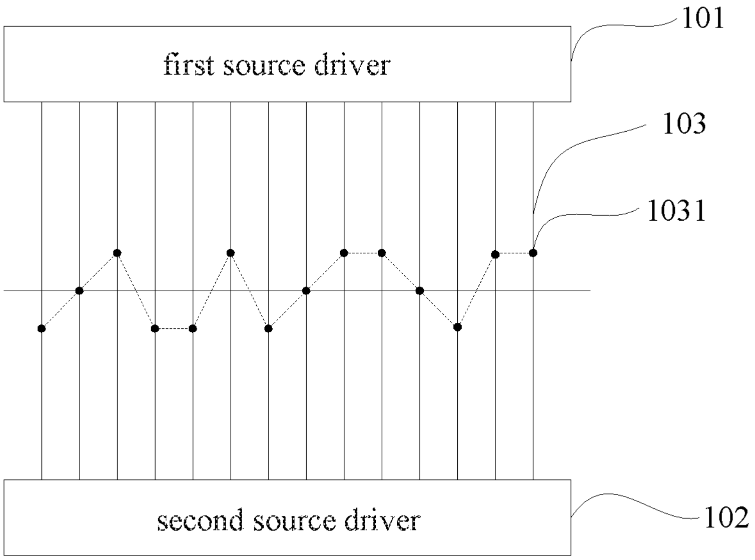
FIG. 8 illustrates a schematic structure of the arrangement middle site of at least two driving signal lines of the bilateral driving device of another embodiment of the present application.

In some possible embodiments, as illustrated in FIG. 8, the connection of the middle site of the at least two driving signal lines 103 can also be irregularly distributed closed to the central axis in a range, so that the connection of the middle site can be an irregular broken line.

In the embodiment of the application, the bilateral driving device includes a first source driver, a second source driver and at least two driving signal lines connected to the first source driver, a second source driver. By the use of the visual characteristics of human, so that the connection of the middle site of the at least two driving signal lines is not parallel to the edge of the display panel to confuse the dark spots and bright spots, to enhance brightness uniformity of the display panel, and improve the display quality.

Figure 9:
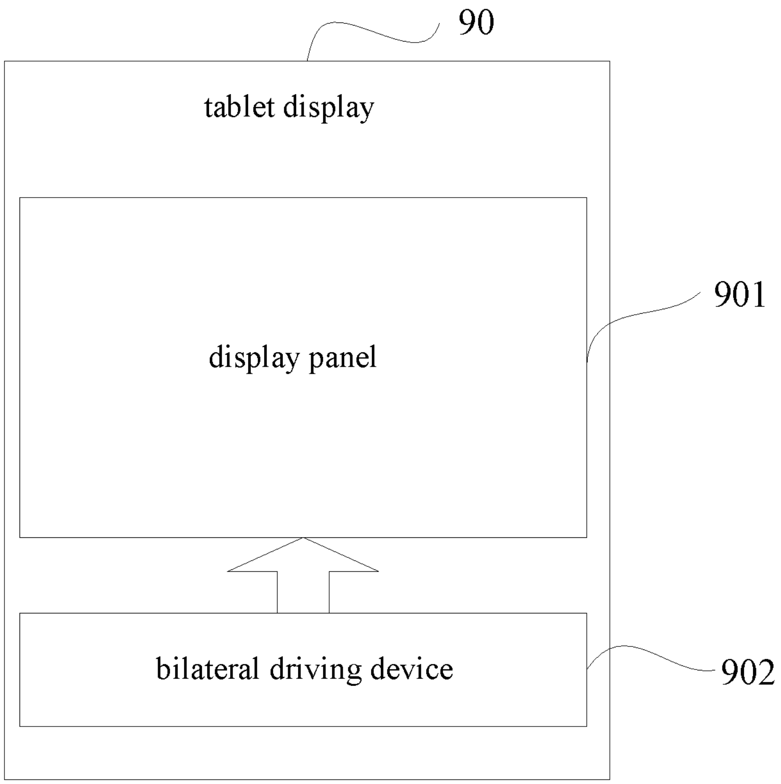
FIG. 9 illustrates a schematic structure of the tablet display of the embodiment of the present application.

Referring to FIG. 9, FIG. 9 illustrates a schematic structure of the tablet display of the embodiment of the present application. As illustrated in FIG. 9, the tablet display 90 includes a display panel 901 and a bilateral driving device 902, wherein the bilateral driving device 902 is the bilateral driving device described in the embodiment shown in FIGS. 1-8. In particular, the bilateral driving device 902 can be used in the display panel 901 to provide a source driving signal.

In some possible embodiments, the tablet display can be a liquid crystal tablet display, and the display panel 901 is a liquid crystal panel.

In other possible embodiments, the tablet display may be an organic light-emitting diode, OLED display, the display panel 901 is an OLED panel.

It can be known according to the relevant description of the embodiments illustrated in FIGS. 1-8, the tablet display of the embodiment of the present application can utilize the visual characteristics of the human eye, by the connection of the middle site of the at least two driving signal lines is not parallel to the edge of the display panel to confuse the dark spots and bright spots, to enhance brightness uniformity of the display panel, and improve the display quality.

Above are embodiments of the present application, which does not limit the scope of the present application. Any modifications, equivalent replacements or improvements within the spirit and principles of the embodiment described above should be covered by the protected scope of the invention.

What is claimed is:

1. A bilateral driving device used in a display panel, wherein the bilateral driving device comprising a first source driver, a second source driver and at least two driving signal lines connected to the first source driver and the second source driver, wherein each of the at least two driving signal lines comprises a middle site at middle of the driving signal line, and each of the at least two driving signal lines is parallel to a first specific edge of the display panel;

wherein a connection of the middle site of the at least two driving signal lines is not parallel to a second specific edge of the display panel, and the connection of the middle site of adjacent two of the at least two driving signal lines is a straight line;

wherein with respect to the second specific edge, the connection of the middle site of the at least two driving signal lines can be in a triangular wave arrangement;

wherein along a specific direction of the second specific edge, a distance from the middle site of the at least two driving signal lines to the second specific edge is increasing or decreasing alternately within a predetermined distance range, and makes the middle site of the at least two driving signal lines can be in a triangular wave arrangement; and wherein along the specific direction of the second specific edge, the distance from the middle site of the at least two driving signal lines to the second specific edge can be a first distance and a second distance alternately, and makes the distance from the middle site of the at least two driving signal lines to the second specific edge is increasing or decreasing alternately within a predetermined distance range.

2. The bilateral driving device according to claim 1, wherein with respect to the second specific edge, the connection of the middle site of the at least two driving signal lines can be in a trapezoidal wave arrangement.

3. The bilateral driving device according to claim 1, wherein with respect to the second specific edge, the connection of the middle site of the at least two driving signal lines can be in stepped increasing arrangement or in stepped descending arrangement alternately.

4. The bilateral driving device according to claim 1, wherein with respect to the second specific edge, the connection of the middle site of the at least two driving signal lines can be serrated increasing or decreasing in alternatively.

5. The bilateral driving device according to claim 1, wherein the first source driver and the second source driver are distributed and arranged along two opposite edges of the display panel separately, and wherein the second specific edge is the edge of the first source driver distributed along or the edge of the second source driver distributed along.

6. A tablet display, wherein the tablet display comprising a display panel and a bilateral driving device, wherein the bilateral driving device is used to provide a source driving signal to the display panel;

the bilateral driving device comprising a first source driver, a second source driver and at least two driving signal lines connected to the first source driver, a second source driver, wherein each of the at least two driving signal lines comprises a middle site at middle of the driving signal line, and each of the at least two driving signal lines is parallel to a first specific edge of the display panel;

wherein a connection of the middle site of the at least two driving signal lines is not parallel to a second specific edge of the display panel, and the connection of the middle site of adjacent two of the at least two driving signal lines is a straight line;

wherein with respect to the second specific edge, the connection of the middle site of the at least two driving signal lines can be in a triangular wave arrangement;

wherein along a specific direction of the second specific edge, a distance from the middle site of the at least two driving signal lines to the second specific edge is increasing or decreasing alternately within a predetermined distance range, and makes the middle site of the at least two driving signal lines can be in a triangular wave arrangement; and wherein along the specific direction of the second specific edge, the distance from the middle site of the at least two driving signal lines to the second specific edge can be a first distance and a second distance alternately, and makes the distance from the middle site of the at least two driving signal lines to the second specific edge is increasing or decreasing alternately within a predetermined distance range.

7. The tablet display according to claim 6, wherein with respect to the second specific edge, the connection of the middle site of the at least two driving signal lines can be in a trapezoidal wave arrangement.

8. The tablet display according to claim 6, wherein with respect to the second specific edge, the connection of the middle site of the at least two driving signal lines can be in stepped increasing arrangement or in stepped descending arrangement alternately.

9. The tablet display according to claim 6, wherein with respect to the second specific edge, the connection of the middle site of the at least two driving signal lines can be serrated increasing or decreasing in alternatively.

10. The tablet display according to claim 6, wherein the first source driver and the second source driver are distributed and arranged along two opposite edges of the display panel separately, and wherein the second specific edge is the edge of the first source driver distributed along or the edge of the second source driver distributed along.

11. The tablet display according to claim 6, wherein the display panel is a liquid crystal panel or an organic light-emitting diode, OLED display.

* * * * *